United States Patent
Watanabe

(10) Patent No.: US 12,200,249 B2
(45) Date of Patent: Jan. 14, 2025

(54) VIDEO TRANSMISSION METHOD, VIDEO TRANSMISSION SYSTEM, AND CONTROL DEVICE

(71) Applicant: TOYOTA JIDOSHA KABUSHIKI KAISHA, Toyota (JP)

(72) Inventor: Toshinobu Watanabe, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 18/185,650

(22) Filed: Mar. 17, 2023

(65) Prior Publication Data
US 2023/0379492 A1    Nov. 23, 2023

(30) Foreign Application Priority Data

May 17, 2022  (JP) ................................. 2022-080828

(51) Int. Cl.
| | | |
|---|---|---|
| H04N 5/45 | (2011.01) | |
| G05D 1/00 | (2006.01) | |
| H04N 19/105 | (2014.01) | |
| H04N 19/146 | (2014.01) | |
| H04N 19/59 | (2014.01) | |

(52) U.S. Cl.
CPC ........... *H04N 19/59* (2014.11); *G05D 1/0038* (2013.01); *H04N 19/105* (2014.11); *H04N 19/146* (2014.11)

(58) Field of Classification Search
CPC ........................................ H04N 5/45
USPC ..................................... 375/240.12
See application file for complete search history.

(56) References Cited

U.S. PATENT DOCUMENTS

| | | | |
|---|---|---|---|
| 2009/0244404 A1* | 10/2009 | Park | H04N 19/597 348/739 |
| 2016/0214533 A1* | 7/2016 | Doyle | H04N 7/181 |
| 2018/0266887 A1* | 9/2018 | Frank | B64U 20/87 |
| 2022/0301427 A1 | 9/2022 | Ueno et al. | |

FOREIGN PATENT DOCUMENTS

| | | |
|---|---|---|
| JP | 6-078308 A | 3/1994 |
| JP | 2010-114575 A | 5/2010 |
| JP | 2011-009823 A | 1/2011 |

(Continued)

OTHER PUBLICATIONS

Chao Dong et al., "Image Super-Resolution Using Deep Convolutional Networks", arXiv: 1501.00092v3[cs.CV], Jul. 31, 2015, https://arxiv.org/pdf/1501.00092.pdf, pp. 1-14.

*Primary Examiner* — Jeffery A Williams
(74) *Attorney, Agent, or Firm* — Sughrue Mion, PLLC

(57) ABSTRACT

A plurality of pieces of video data are respectively captured by a plurality of cameras mounted on a moving body. Before data transmission from the moving body to an external device, a data reduction process is executed to reduce the transmission data amount. The data reduction process includes at least two of: a selection process that omits at least one of the plurality of pieces of video data from the transmission video data according to a scene where the moving body is placed; a reduction process that reduces at least one of the plurality of pieces of video data; and a uniting process that combines first video data and second video data such that a screen of the second video data is displayed in a screen of the first video data.

9 Claims, 19 Drawing Sheets

(56) References Cited

FOREIGN PATENT DOCUMENTS

| | | |
|---|---|---|
| JP | 2011-176423 A | 9/2011 |
| JP | 2014-071776 A | 4/2014 |
| JP | 2014-150299 A | 8/2014 |
| JP | 2021-026554 A | 2/2021 |

* cited by examiner

VIDEO TRANSMISSION METHOD, VIDEO TRANSMISSION SYSTEM, AND CONTROL DEVICE

CROSS-REFERENCE TO RELATED APPLICATION

This application claims priority to Japanese Patent Application No. 2022-080828 filed on May 17, 2022, the entire contents of which are incorporated by reference herein.

BACKGROUND

Technical Field

The present disclosure relates to a technique for transmitting video data from a moving body to an external device.

Background Art

Patent Literature 1 discloses a display method based on a picture-in-picture technique in an interactive system such as a videophone or a WEB chat via a network.

In addition, Patent Literatures 2 and 3 are known as techniques related to video transmission.

Non-Patent Literature 1 discloses a "super-resolution technique" that converts an input low-resolution image into a high-resolution image. In particular, Non-Patent Literature 1 discloses an SRCNN that applies deep learning based on a convolutional neural network (CNN) to the super-resolution (SR). A model for converting (mapping) the input low resolution image into the high resolution image is obtained through the machine learning.

LIST OF RELATED ART

Patent Literature 1: Japanese Laid-Open Patent Application No. JP-2014-150299
Patent Literature 2: Japanese Laid-Open Patent Application No. JP-2021-026554
Patent Literature 3: Japanese Laid-Open Patent Application No. JP-2014-071776
Non-Patent Literature 1: Chao Dong, Chen Change Loy, Kaiming He, and Xiaoou Tang, "Image Super-Resolution Using Deep Convolutional Networks", arXiv: 1501.00092v3[cs.CV], Jul. 31, 2015 (https://arxiv.org/pdf/1501.00092.pdf)

SUMMARY

Consider a situation in which video data captured by a camera mounted on a moving body is transmitted to an external device. For example, when a remote support of a moving body is performed, video data captured by a camera mounted on the moving body is transmitted to a remote operator side and used. However, the amount of video data is relatively large. As the number of cameras increases and thus the number of video data (the number of streams) simultaneously transmitted increases, the amount of transmission data increases. The increase in the amount of transmission data causes increases in a communication delay and a communication cost. From a viewpoint of utilization of video data, it is desirable to suppress the communication delay and the communication cost as much as possible.

An object of the present disclosure is to provide a technique capable of reducing an amount of video data transmitted from a moving body to an external device.

A first aspect relates to a video transmission method for transmitting video data from a moving body to an external device.

The video transmission method includes:
acquiring a plurality of pieces of video data respectively captured by a plurality of cameras mounted on the moving body;
executing a data reduction process that reduces a data amount of the plurality of pieces of video data to acquire transmission video data; and
transmitting the transmission video data after the data reduction process from the moving body to the external device.

The data reduction process includes at least two of:
a selection process that omits at least one of the plurality of pieces of video data from the transmission video data according to a scene where the moving body is placed;
a reduction process that reduces at least one of the plurality of pieces of video data; and
a uniting process that combines first video data and second video data such that a screen of the second video data is displayed in a screen of the first video data.

A second aspect relates to a video transmission system for transmitting video data from a moving body to an external device.

The video transmission system includes one or more processors.

The one or more processors are configured to:
acquire a plurality of pieces of video data respectively captured by a plurality of cameras mounted on the moving body;
execute a data reduction process that reduces a data amount of the plurality of pieces of video data to acquire transmission video data; and
transmit the transmission video data after the data reduction process from the moving body to the external device.

The data reduction process includes at least two of:
a selection process that omits at least one of the plurality of pieces of video data from the transmission video data according to a scene where the moving body is placed;
a reduction process that reduces at least one of the plurality of pieces of video data; and
a uniting process that combines first video data and second video data such that a screen of the second video data is displayed in a screen of the first video data.

A third aspect relates to a control device for controlling a moving body.

The control device includes one or more processors.

The one or more processors are configured to:
acquire a plurality of pieces of video data respectively captured by a plurality of cameras mounted on the moving body;
execute a data reduction process that reduces a data amount of the plurality of pieces of video data to acquire transmission video data; and
transmit the transmission video data after the data reduction process to an external device.

The data reduction process includes at least two of:
a selection process that omits at least one of the plurality of pieces of video data from the transmission video data according to a scene where the moving body is placed;
a reduction process that reduces at least one of the plurality of pieces of video data; and a uniting process that combines first video data and second video data such that a screen of the second video data is displayed in a screen of the first video data.

According to the present disclosure, it is possible to reduce the amount of video data transmitted from the moving body to the external device.

EMBODIMENTS

Embodiments of the present disclosure will be described with reference to the accompanying drawings.

1. Overview of Video Transmission System

Figure 1:
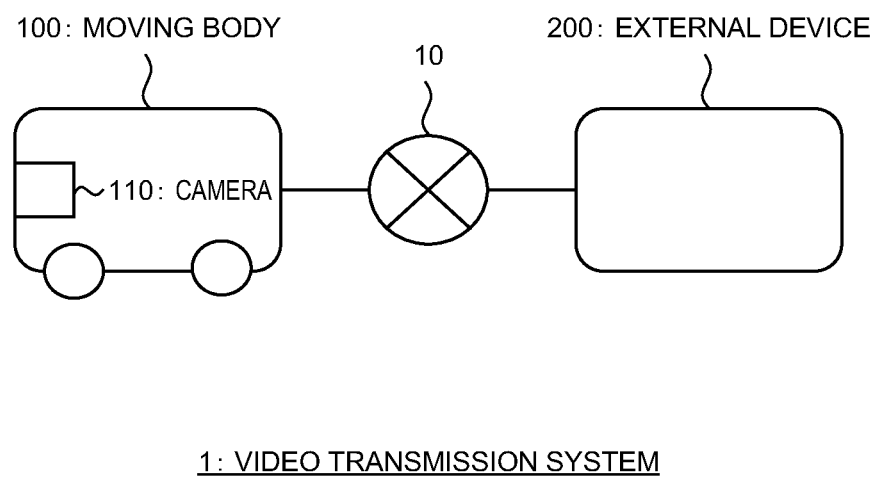
FIG. 1 is a block diagram showing an overview of a video transmission system according to an embodiment of the present disclosure.

FIG. 1 is a conceptual diagram showing an overview of a video transmission system 1 according to the present embodiment. The video transmission system 1 includes a moving body 100 and an external device 200 present outside the moving body 100. The moving body 100 and the external device 200 are connected to each other via a communication network 10. The moving body 100 and the external device 200 are able to communicate with each other via a communication network 10. Typically, the moving body 100 and the external device 200 perform wireless communication.

Examples of the moving body 100 include a vehicle, a robot, a flying object, and the like. The vehicle may be an automated driving vehicle or a vehicle driven by a driver. Examples of the robot include a logistics robot, a work robot, and the like. Examples of the flying object include an airplane, a drone, and the like.

The external device 200 is, for example, a management server that manages the moving body 100. As another example, the external device 200 may be a remote operator terminal used for a remote support of the moving body 100. As still another example, the external device 200 may be another moving body different from the moving body 100.

A camera 110 is mounted on the moving body 100. The camera 110 captures video data (streaming data) indicating a situation around the moving body 100. The moving body 100 transmits the video data captured by the camera 110 to the external device 200. The external device 200 receives the video data transmitted from the moving body 100 and uses the received video data.

Figure 2:
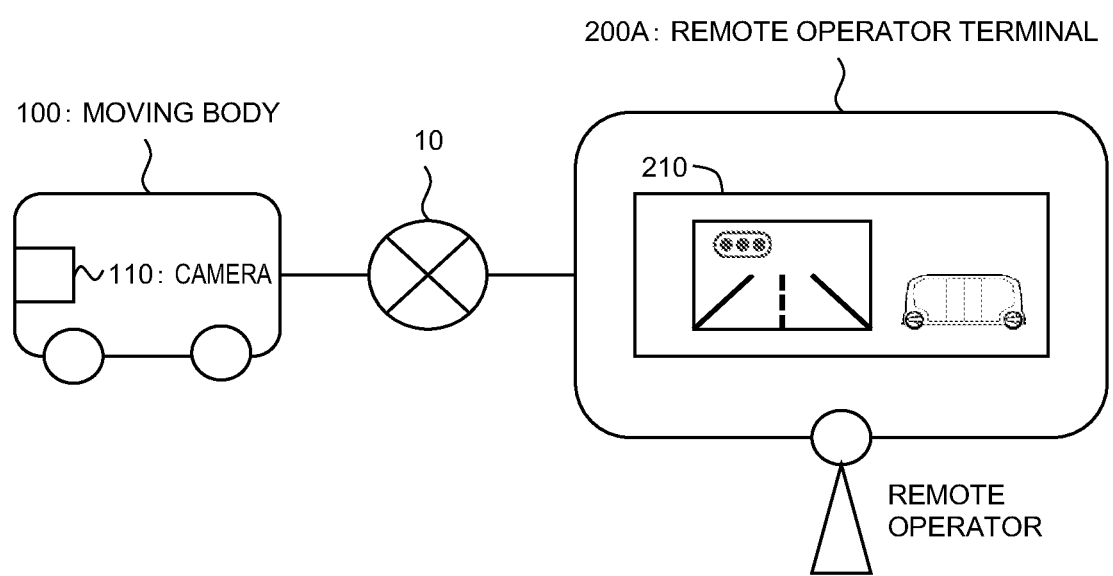
FIG. 2 is a conceptual diagram showing a remote support system which is an application example of a video transmission system according to an embodiment of the present disclosure.

FIG. 2 shows a remote support system 1A which is an application example of the video transmission system 1. The moving body 100 is a target of a remote support performed by a remote operator. The external device 200 is a remote operator terminal 200A operated by the remote operator. The moving body 100 transmits the video data captured by the camera 110 to the remote operator terminal 200A. The remote operator terminal 200A receives the video data transmitted from the moving body unit 100 and displays the received video data on a display device 210. The remote operator views the video data displayed on the display device 210 to grasp the situation around the moving body 100 and remotely support an operation of the moving body 100. Examples of the remote support performed by the remote operator include recognition support, judgement support, remote driving, and the like. An instruction from the remote operator is transmitted from the remote operator terminal 200A to the moving body 100. The moving body 100 operates in accordance with the instruction from the remote operator.

In some cases, a plurality of cameras 110 are mounted on the moving body 100. For example, in the above-described remote support, it is useful to grasp the situation around the moving body 100 by using the plurality of cameras 110.

Figure 3:
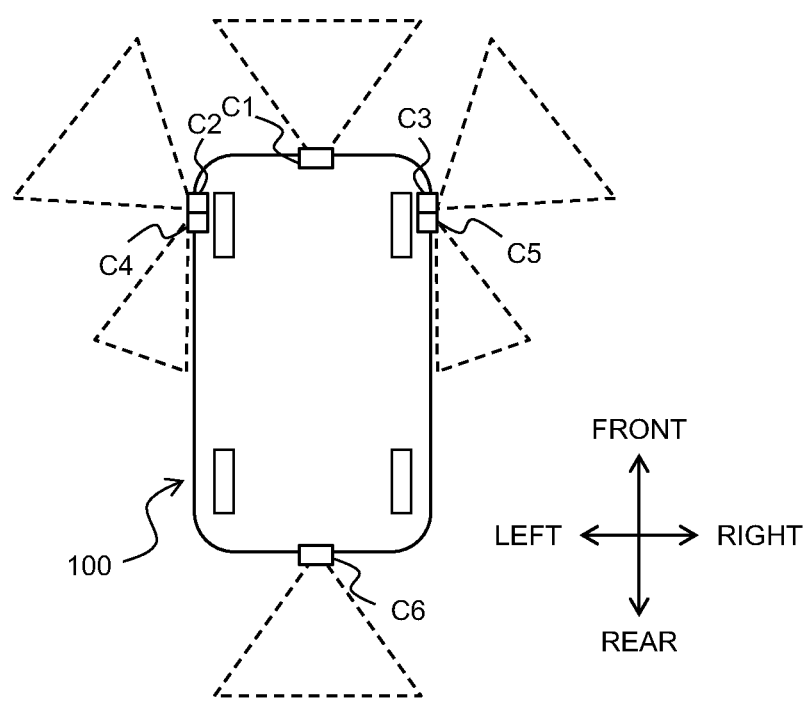
FIG. 3 is a conceptual diagram showing an example of a plurality of cameras mounted on a moving body according to an embodiment of the present disclosure.

FIG. 3 is a conceptual diagram showing an example of the plurality of cameras 110 mounted on the moving body 100. In the example shown in FIG. 3, the moving body 100 is provided with a front camera C1, a left front camera C2, a right front camera C3, a left side camera C4, a right side camera C5, and a rear camera C6. The front camera C1 captures video data in a front direction from the moving body 100. The left front camera C2 captures video data in a left front direction from the moving body 100. The right front camera C3 captures video data in a right front direction from the moving body 100. The left side camera C4 captures video data in a left direction and a left rear direction from the moving body 100. The right side camera C5 captures video data in a right direction and a right rear direction from the moving body 100. The rear camera C6 captures video data in a rear direction from the moving body 100.

When the plurality of cameras 110 are mounted on the moving body 100 as described above, a plurality of pieces of video data are captured by the plurality of cameras 110, respectively. The moving body 100 transmits the plurality of pieces of video data (streaming data) to the external device 200 simultaneously in parallel.

However, the amount of video data is relatively large. As the number of cameras increases and thus the number of video data (the number of streams) simultaneously transmitted increases, the amount of transmission data increases. The increase in the amount of transmission data causes increases in a communication delay and a communication cost. From a viewpoint of utilization of the video data, it is desirable to suppress the communication delay and the communication cost as much as possible. For example, in the case of the remote support of the moving body 100, the communication delay may cause a delay in decision by the remote operator, an awkward remote operation (may possibly cause meandering), and the like. It is therefore desirable to reduce the amount of data transmitted from the moving body 100 as much as possible without deteriorating accuracy of the remote support.

In view of the above, the present embodiment proposes a technique capable of appropriately reducing the amount of video data transmitted from the moving body 100 to the external device 200.

2. Data Reduction Process

The moving body 100 acquires the plurality of pieces of video data respectively captured by the plurality of cameras 110. Before transmitting the plurality of pieces of video data to the external device 200, the moving body 100 executes a "data reduction process" for reducing the data amount of the plurality of pieces of video data. At least one piece of video data acquired as a result of the data reduction process is hereinafter referred to as "transmission video data VT." After the data reduction process, the moving body 100 transmits the transmission video data VT to the external device 200.

Hereinafter, various examples of the data reduction process will be described.

2-1. Selection Process

A "selection process" is a process that omits at least one of the plurality of pieces of video data captured by the plurality of cameras 110 from the transmission video data VT. That is, the selection process selects only video data having a high priority from among the plurality of pieces of video data, and excludes video data having a low priority. Here, the priority is dynamically determined according to a scene where the moving body 100 is placed. That is, the selection process omits at least one of the plurality of pieces of video data from the transmission video data VT according to a scene where the moving body 100 is placed.

Figure 4:
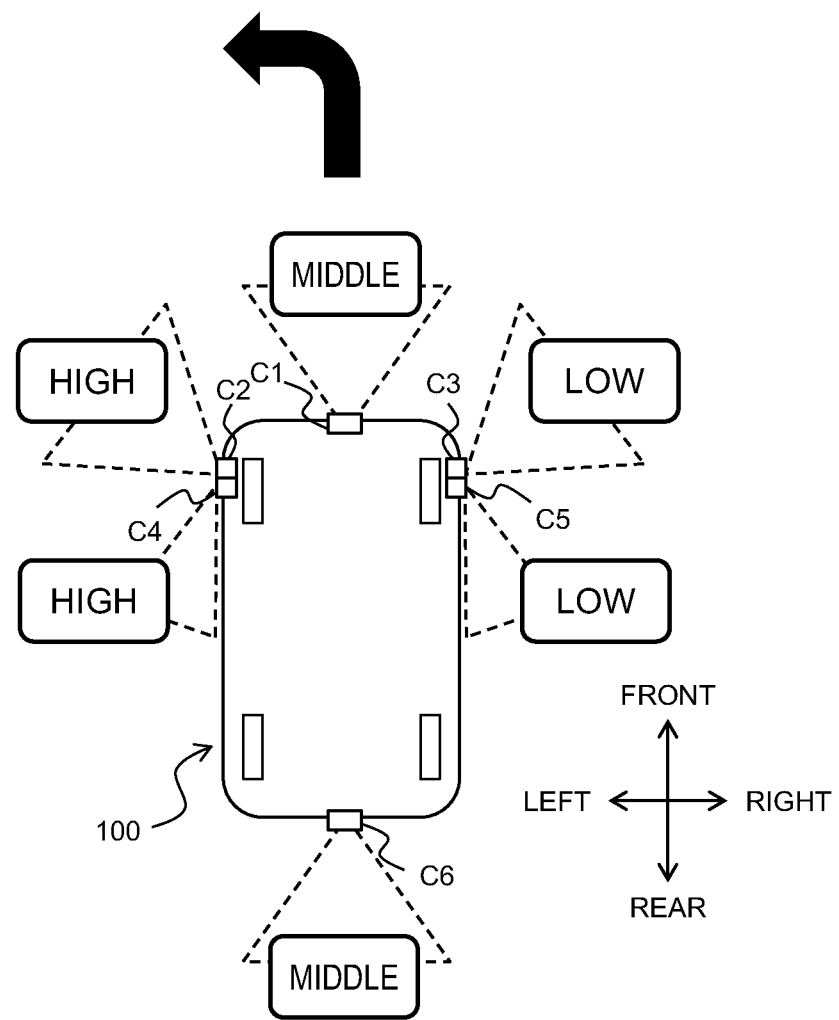
FIG. 4 is a conceptual diagram for explaining an example of a selection process according to an embodiment of the present disclosure.

FIG. 4 is a conceptual diagram for explaining an example of the selection process. In the example shown in FIG. 4, the moving body 100 is scheduled to make a left turn or is making a left turn. In this case, the priorities of the video data in the left front direction, the left direction, and the left rear direction are relatively high. On the other hand, the priorities of the video data in the right front direction, the right direction, and the right rear direction are relatively low. Therefore, it is conceivable to omit the video data in the right front direction, the right direction, and the right rear direction from the transmission video data VT. The same applies to a case where a bus pulls over in the left direction for making a stop at a bus stop.

Figure 5:
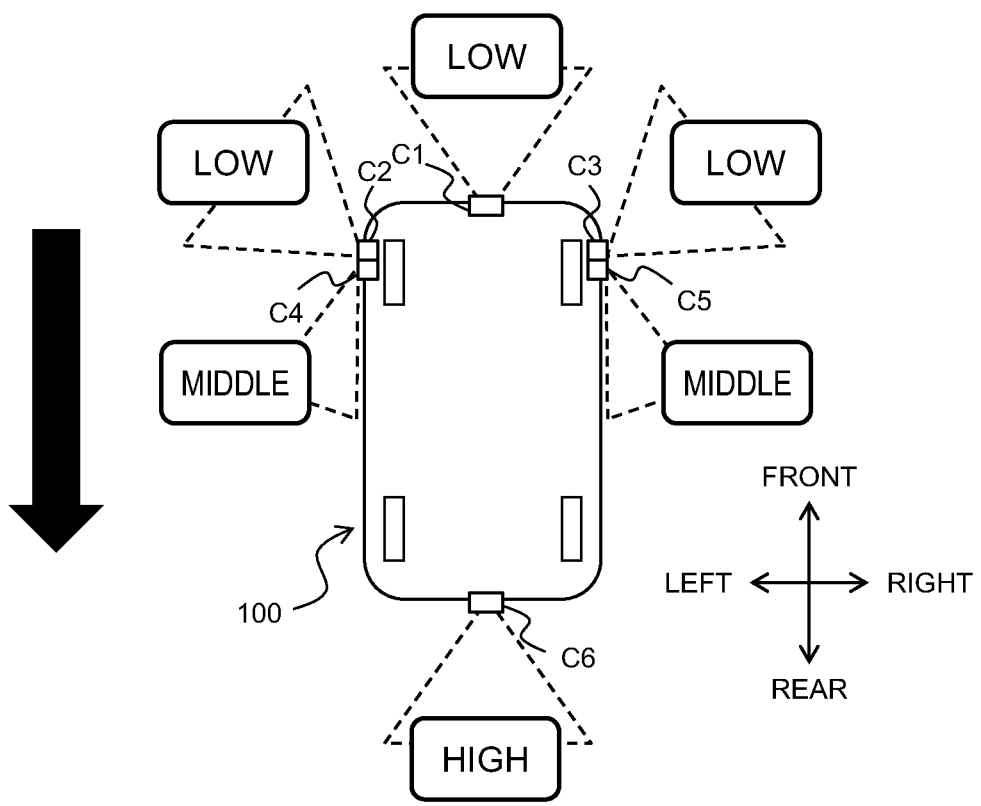
FIG. 5 is a conceptual diagram for explaining another example of a selection process according to an embodiment of the present disclosure.

FIG. 5 is a conceptual diagram for explaining another example of the selection process. In the example shown in FIG. 5, the moving body 100 is scheduled to move backward or is moving backward. In this case, the priority of the video data in the rear direction is the highest. On the other hand, the priorities of the video data in the front direction, the left front direction, and the right front direction are relatively low. Therefore, it is conceivable to omit the video data in the front direction, the left front direction, and the right front direction from the transmission video data VT.

Figure 6:
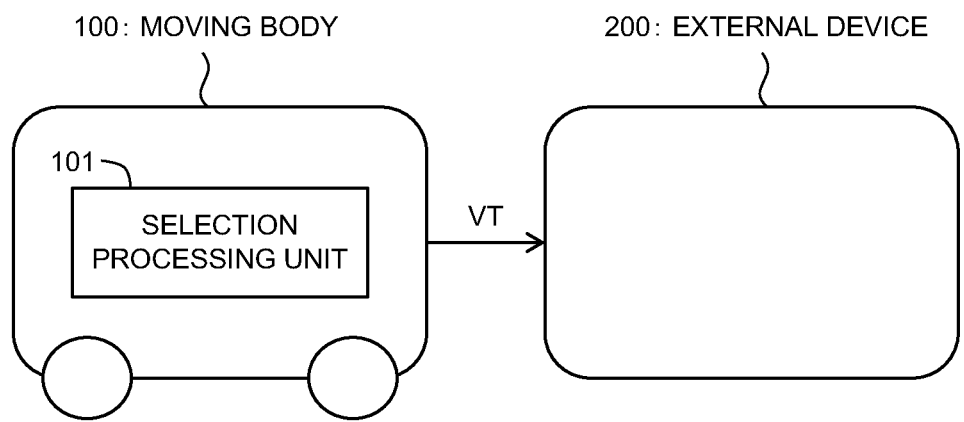
FIG. 6 is a conceptual diagram showing a selection processing unit according to an embodiment of the present disclosure.

FIG. 6 is a conceptual diagram showing a selection processing unit 101 according to the present embodiment. The selection processing unit 101 is included in the moving body 100 and executes the selection process.

For example, the selection processing unit 101 acquires information reflecting a "planned movement direction" of the moving body 100. For example, when the moving body 100 is a vehicle, the planned movement direction is determined on the basis of a steering wheel steering direction, a steering wheel steering angle, blinker information, a gear position, a wheel speed, and the like. As another example, the planned movement direction may be determined based on a current position and a target travel route of the moving body 100. The selection processing unit 101 dynamically sets the priority of the plurality of pieces of video data on the basis of the planned movement direction of the moving body 100. More specifically, the selection processing unit 101 sets the priority of the video data in a direction closer to the planned movement direction to be higher than the priority of the video data in a direction farther from the planned movement direction. Then, the selection processing unit 101 selects the video data having a high priority and omits the video data having a low priority from the transmission video data VT.

As another example, a "specific object" shown in the video data may be taken into consideration. The specific object is an object that the remote operator is likely to focus on. For example, the specific object includes at least one of a pedestrian, a bicycle, another vehicle, a traffic light, and a sign. The selection processing unit 101 recognizes a specific object in the video data by analyzing images constituting the video data by a known method. Then, the selection processing unit 101 sets the priority of the video data showing a larger number of the specific objects to be higher than the priority of the video data showing a smaller number of the specific objects. Then, the selection processing unit 101 selects the video data having a high priority and omits the video data having a low priority from the transmission video data VT.

The selection process described above makes it possible to reduce the data amount of the transmission video data VT.

2-2. Reduction Process

A "reduction process" is a process that reduces at least one of the plurality of pieces of video data captured by the plurality of cameras 110. More specifically, the reduction process reduces the number of pixels (i.e., s size) of the image constituting the video data. It can be said that the reduction process reduces a definition of the video data.

However, when the reduction process is applied, an image quality of the video data deteriorates. This is not preferable from a viewpoint of use of the video data on the reception side. In view of the above, according to the present embodiment, a "super-resolution technique" is utilized for improving the image quality of the video data in the external device 200 on the reception side. The super-resolution technique is able to convert a low-resolution image to be input into a high-resolution image. Various methods of the super-resolution technique have been proposed (see, for example, Non-Patent Literature 1). In the present embodiment, the method of the super-resolution technique is not particularly limited.

Figure 7:
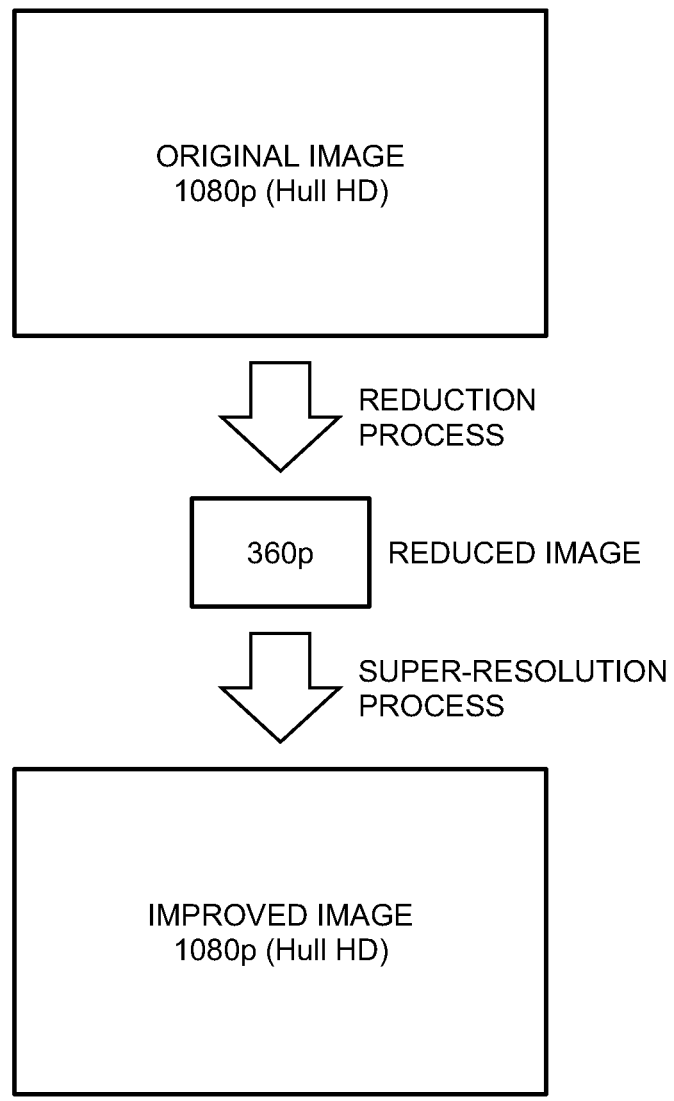
FIG. 7 is a conceptual diagram for explaining an example of a reduction process and a super-resolution process according to an embodiment of the present disclosure.

FIG. 7 is a conceptual diagram for explaining an example of the reduction process and the super-resolution process. A definition of an original image is 1080p. As a result of the reduction process, the definition is reduced to 360p. When the definition is reduced from 1080p to 360p, the data amount is reduced to about ⅑ of the original image. By the super-resolution process, the definition is restored to 1080p.

Figure 8:
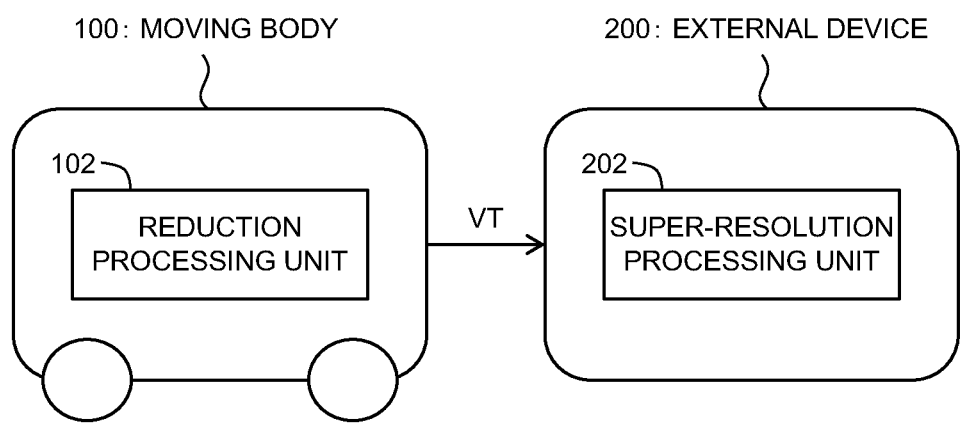
FIG. 8 is a conceptual diagram showing a reduction processing unit and a super-resolution processing unit according to an embodiment of the present disclosure.

FIG. 8 is a conceptual diagram showing a reduction processing unit 102 and a super-resolution processing unit 202 according to the present embodiment. The reduction processing unit 102 is included in the moving body 100 and executes the reduction process. The data amount of the transmission video data VT is reduced by the reduction process.

The super-resolution processing unit 202 is included in the external device 200 and executes the super-resolution process. More specifically, based on the video data received from the moving body 100, the super-resolution processing unit 202 determines whether the reduction process has been applied to the video data. A reception bit rate of the video data to which the reduction process is applied is remarkably reduced. The reduction width is remarkably larger than a variation width of the bit rate unrelated to the reduction process. Therefore, the super-resolution processing unit 202 can determine whether or not the reduction process has been applied to the video data based on the variation in the reception bit rate. When the reduction process has been applied to the received video data, the super-resolution processing unit 202 applies the super-resolution technique to the received video data. As a result, the image quality of the video data to which the reduction process has been applied is improved. Since the image quality of the video data is improved, it becomes easier to accurately grasp the situation around the moving body 100.

2-3. Uniting Process

A "uniting process" is a process that unites two or more of the plurality of pieces of video data captured by the plurality of cameras 110. For the sake of explanation, first video data and second video data included in the plurality of pieces of video data are considered. The first video data is captured by a main camera, and the second video data is captured by a sub camera. The uniting process combines (synthesizes) the first video data and the second video data such that a screen of the second video data is displayed in a screen of the first video data.

Figure 9:
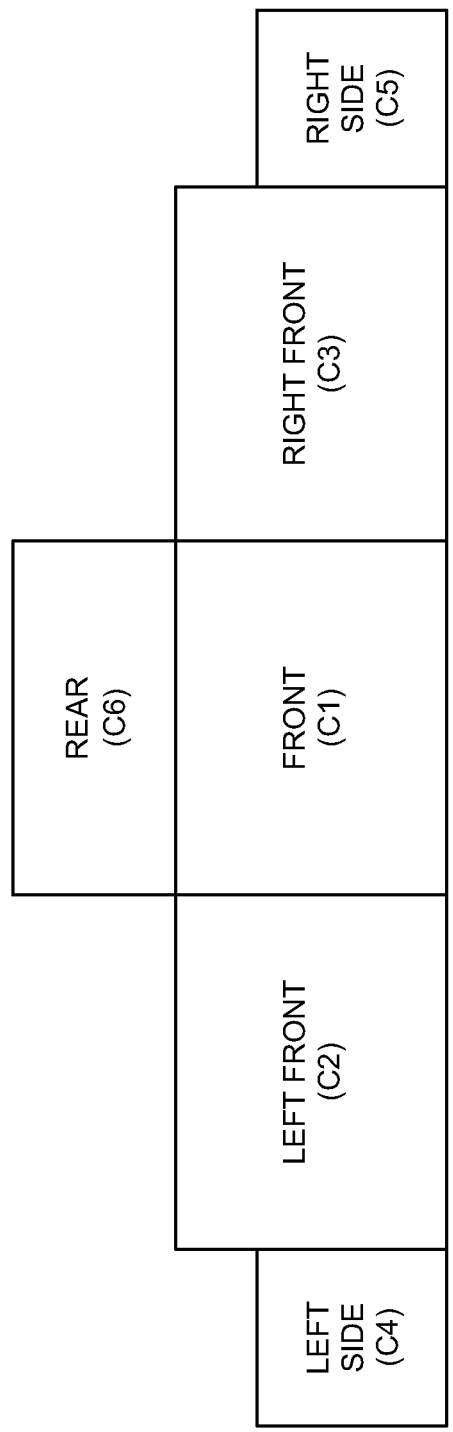
FIG. 9 is a conceptual diagram for explaining an example of a uniting process according to an embodiment of the present disclosure.
Figure 10:
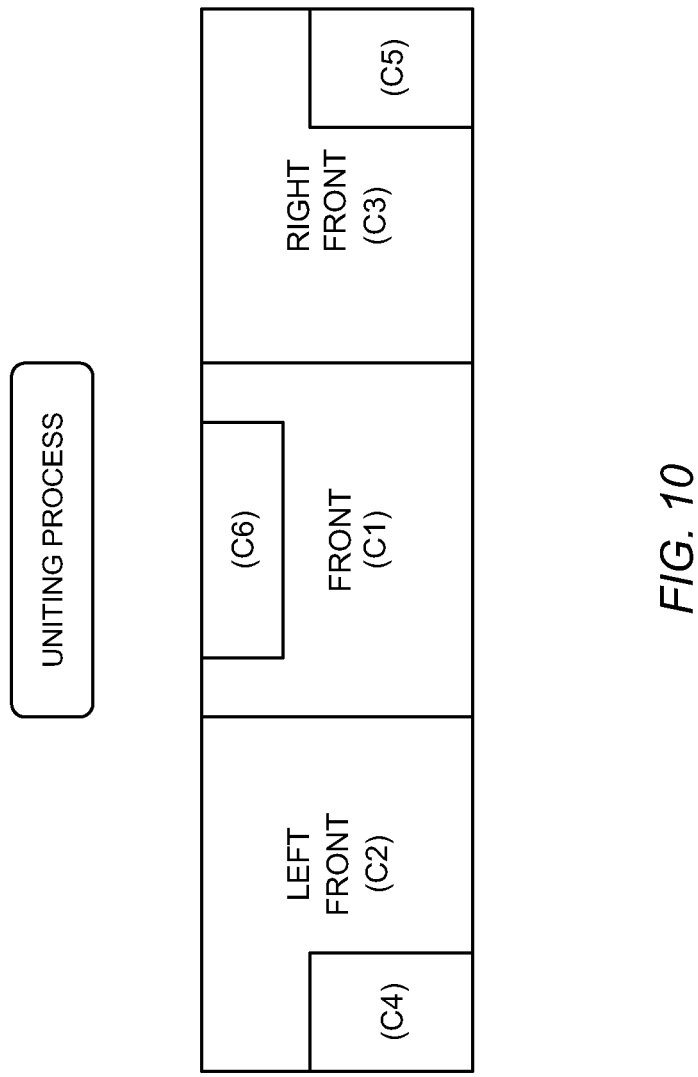
FIG. 10 is a conceptual diagram for explaining an example of a uniting process according to an embodiment of the present disclosure.

FIGS. 9 and 10 are conceptual diagrams for explaining an example of the uniting process. FIG. 9 shows a set of video data before the uniting process, and FIG. 10 shows a set of video data group after the uniting process.

For example, the front camera C1 and the rear camera C6 form a pair. The front camera C1 is the main camera, and the rear camera C6 is the sub camera. As shown in FIG. 10, the uniting process is performed such that a screen of the second video data captured by the rear camera C6 is displayed in a screen of the first video data captured by the front camera C1.

More specifically, a part of an image area of the first video data captured by the front camera C1 is deleted. In addition, an image size of the second video data captured by the rear camera C6 is adjusted (reduced) to match the image area deleted from the first video data. Then, the first video data and the second video data are combined (synthesized) such that the image of the adjusted second video data is inserted into the image area deleted from the first video data. In this manner, combined video data in which the first video data and the second video data are combined is generated.

Similarly, the left front camera C2 and the left side camera C4 form a pair. The left front camera C2 is the main camera, and the left side camera C4 is the sub camera. Further, the right front camera C3 and the right side camera C5 form a pair. The front right camera C3 is the main camera, and the right side camera C5 is the sub camera.

In the example shown in FIGS. 9 and 10, the number of pieces of video data (i.e., the number of streams) is reduced from six to three by the uniting process. This contributes to a reduction in the data amount. In addition, the deletion of the part of the image area of the first video data and the reduction of the image size of the second video data also contribute to the reduction in the data amount.

Figure 11:
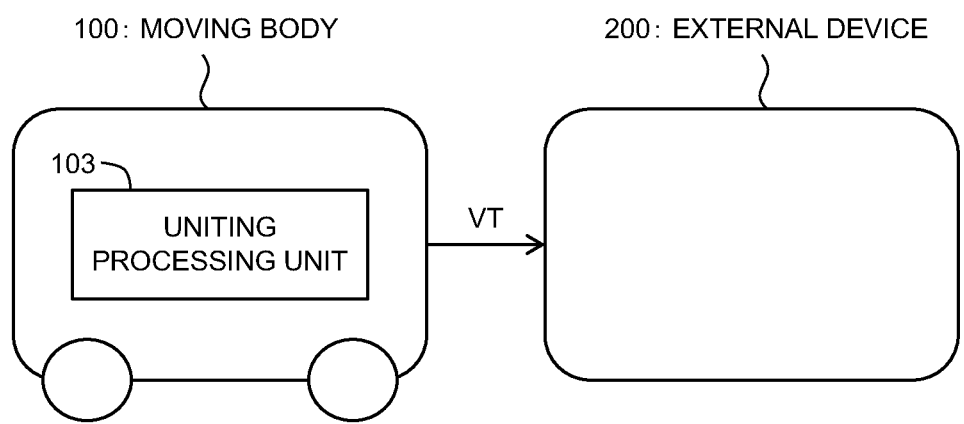
FIG. 11 is a conceptual diagram showing a uniting processing unit according to an embodiment of the present disclosure.

FIG. 11 is a conceptual diagram showing a uniting processing unit 103 according to the present embodiment. The uniting processing unit 103 is included in the moving body 100 and executes the uniting process.

It should be noted that the uniting process may be referred to as a "picture-in-picture process." However, although a general picture-in-picture process is performed on the reception side, the uniting process according to the present embodiment is performed on the transmission side.

2-4. Effects

As described above, according to the present embodiment, the data reduction process is executed in the moving body 100. That is, before the plurality of pieces of video data are transmitted from the moving body 100 to the external device 200, the data amount of the plurality of pieces of video data is reduced. Since the transmission data amount is reduced, the communication delay and the communication cost are suppressed. In addition, communication is stabilized.

3. Combination of Data Reduction Process

It is also possible to combine two or more of the selection process, the reduction process, and the uniting process described above. Hereinafter, various examples of the combination will be described.

3-1. First Example

Figure 12:
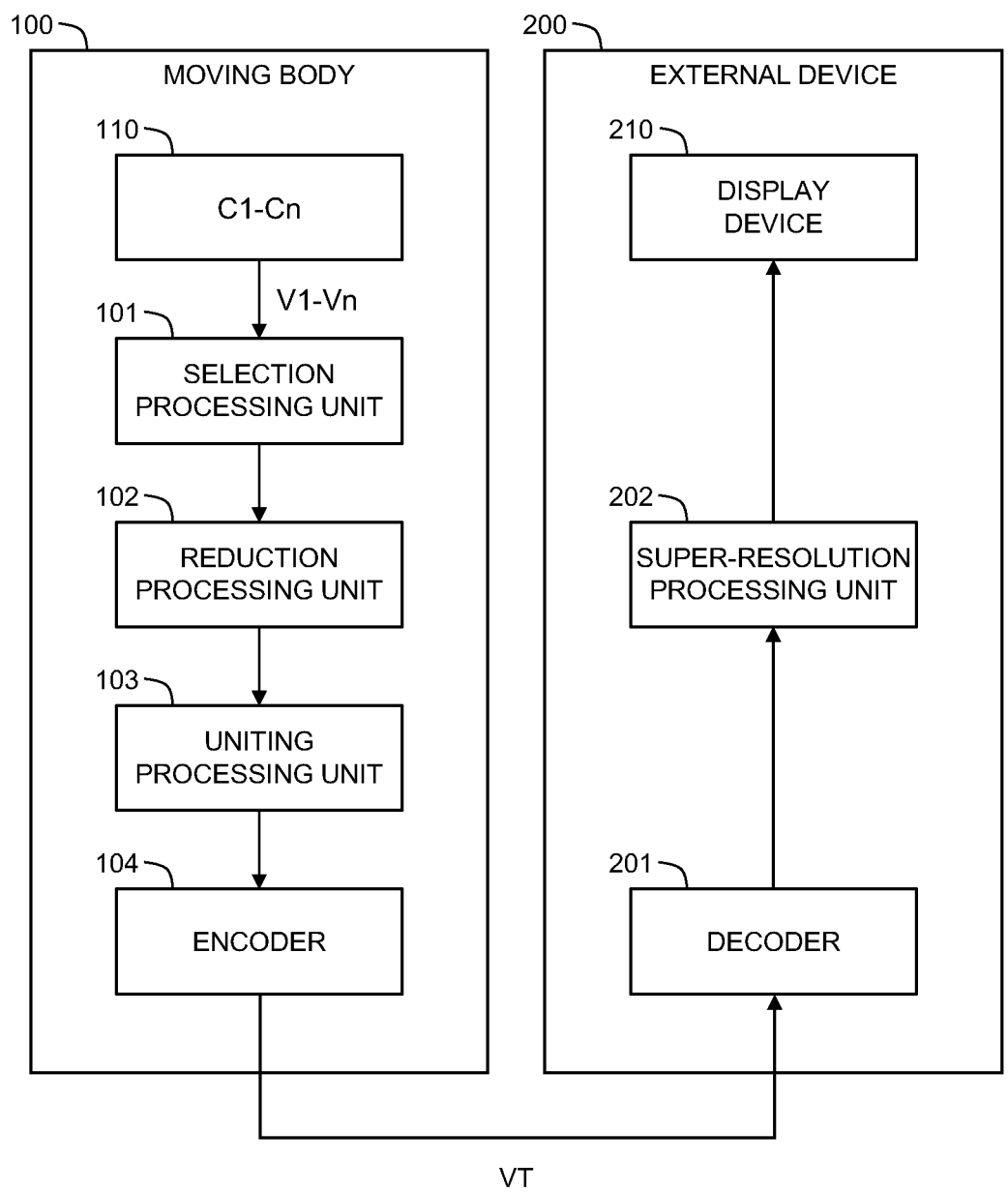
FIG. 12 is a block diagram for explaining a first example of a data reduction process according to an embodiment of the present disclosure.

FIG. 12 is a block diagram showing a first example of the data reduction process.

The moving body 100 includes a plurality of cameras C1 to Cn (n is an integer equal to or greater than 2), the selection processing unit 101, the reduction processing unit 102, the uniting processing unit 103, and an encoder 104. A plurality of pieces of video data V1 to Vn are captured by the plurality of cameras C1 to Cn, respectively. The selection processing unit 101 executes the selection process on the plurality of pieces of video data V1 to Vn. Subsequently, the reduction processing unit 102 executes the reduction process on the video data after the selection process. That is, the reduction processing unit 102 executes the reduction process on the video data selected without being omitted by the selection process. Subsequently, the uniting processing unit 103 executes the uniting process on the video data after the reduction process. As a result, the transmission video data VT with a reduced data amount is obtained. Thereafter, the encoder 104 encodes the transmission video data VT. The moving body 100 transmits the transmission video data VT to the external device 200.

The external device 200 includes a decoder 201, the super-resolution processing unit 202, and a display device 210. The external device 200 receives the transmission video data VT transmitted from the moving body object 100. The decoder 201 decodes the received video data. The super-resolution processing unit 202 applies the super-resolution technique to the received video data to which the reduction process has been applied, to improve the image quality. Thereafter, the display device 210 displays the received video data.

Figure 13:
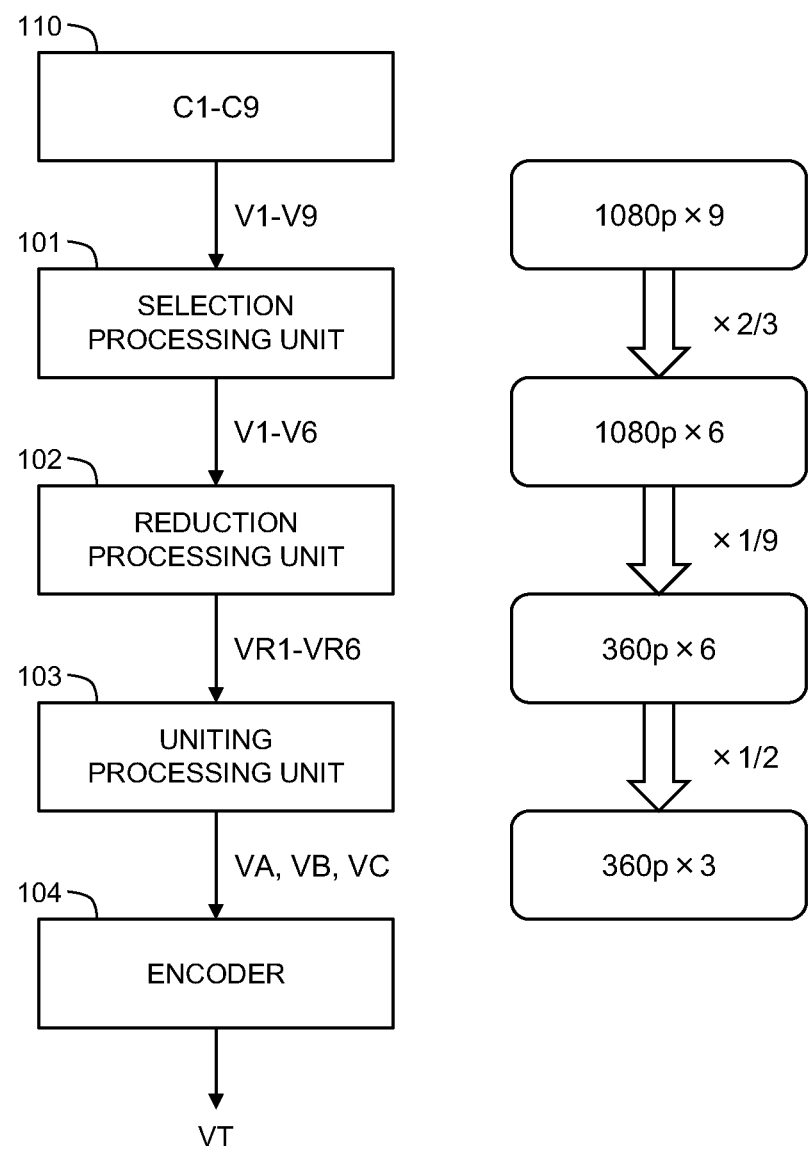
FIG. 13 is a block diagram for explaining a first example of a data reduction process according to an embodiment of the present disclosure.

FIG. 13 shows an example of an amount of data reduction. Nine pieces of video data V1 to V9 are captured by nine cameras C1 to C9, respectively. A definition of each video data is 1080p. Six pieces of video data V1 to V6 are selected by the selection process, and thus the data amount is reduced to ⅔. Subsequently, due to the reduction process, the video data V1 to V6 become reduced video data VR1 to VR6, respectively. The definition is reduced from 1080p to 360p, and thus the data amount is reduced to about ⅑. Subsequently, due to the uniting process, the six pieces of video data VR1 to VR6 are united into three pieces of combined video data VA, VB, and VC, and thus the data amount is reduced to ½. As a result, the data amount is reduced by about 97% in total.

As described above, in the first example, the data reduction process includes the selection process, the reduction process, and the uniting process. The selection process, the reduction process, and the uniting process are executed in this order. Such the order of processing brings the following effects.

The reduction process is executed after at least one piece of video data is omitted by the selection process. Since the reduction process is not executed on unnecessary video data, a processing load of the reduction process is reduced.

Moreover, the uniting process is executed after at least one piece of video data is omitted by the selection process. Since the uniting process is not executed on unnecessary video data, a processing load of the uniting process is reduced.

Furthermore, the uniting process is executed after the video data is reduced by the reduction process. That is, the uniting process is executed after the image size is reduced by the reduction process. Therefore, a processing load of image processing required in the uniting process is reduced.

3-2. Second Example

Figure 14:
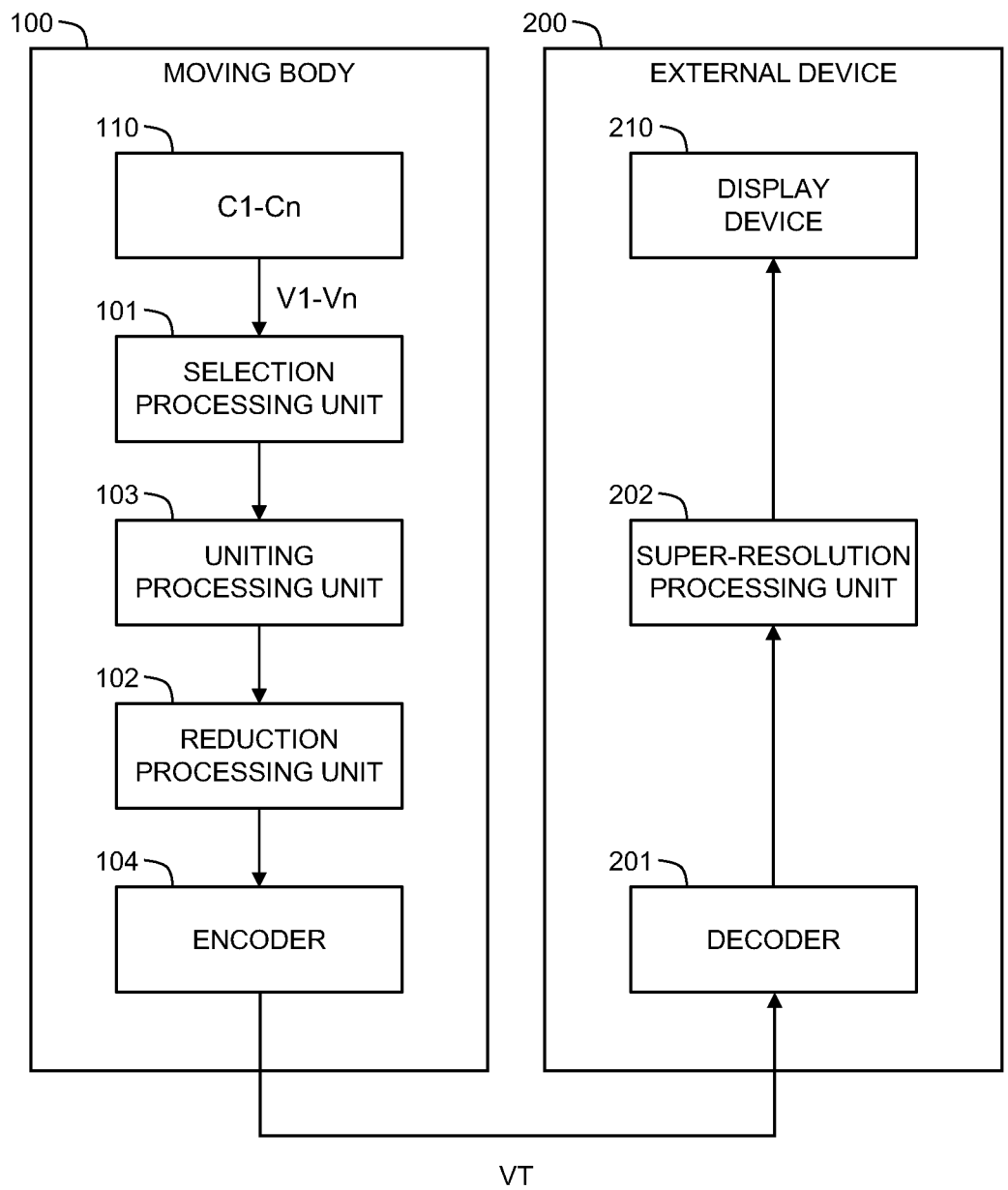
FIG. 14 is a block diagram for explaining a second example of a data reduction process according to an embodiment of the present disclosure.

FIG. 14 is a block diagram showing a second example of the data reduction process. A description overlapping with the first example will be omitted as appropriate. In the second example, the order of the reduction process and the uniting process is reversed as compared with the first example. That is, the selection process, the uniting process, and the reduction process are executed in this order. The uniting processing unit 103 executes the uniting process on the video data after the selection process. That is, the uniting processing unit 103 executes the uniting process on the video data selected without being omitted by the selection process. Subsequently, the reduction processing unit 102 executes the reduction process on the video data after the uniting process. Such the order of processing brings the following effects.

The uniting process is executed after at least one piece of video data is omitted by the selection process. Since the uniting process is not executed on unnecessary video data, the processing load of the uniting process is reduced.

Moreover, the reduction process is executed after at least one piece of video data is omitted by the selection process. Since the reduction process is not executed on unnecessary video data, the processing load of the reduction process is reduced.

3-3. Third Example

Figure 15:
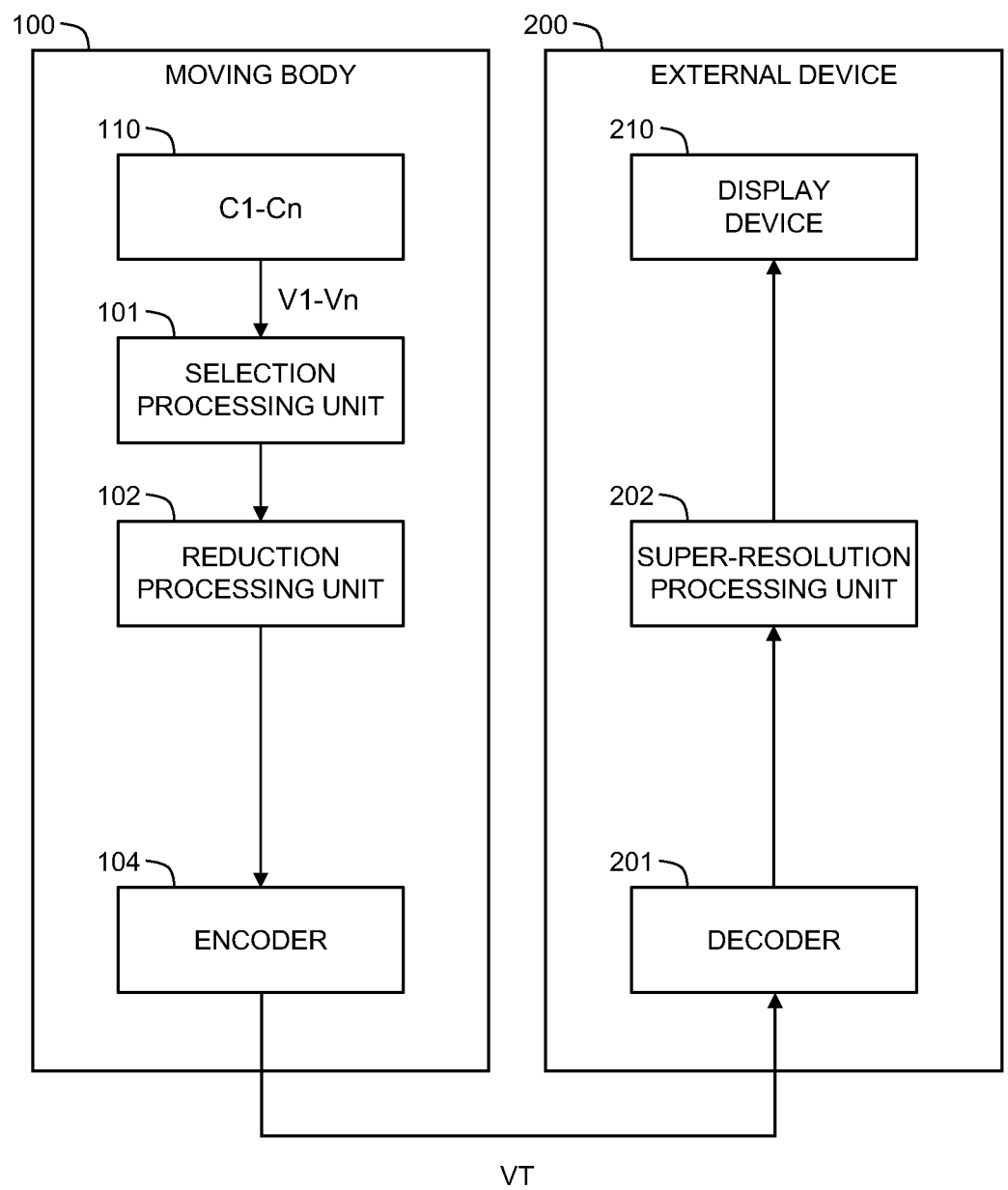
FIG. 15 is a block diagram for explaining a third example of a data reduction process according to an embodiment of the present disclosure.

FIG. 15 is a block diagram showing a third example of the data reduction process. A description overlapping with the first example and the second example will be omitted as appropriate. In the third example, the data reduction process includes the selection process and the reduction process. The selection process and the reduction process are executed in this order. Such the order of processing brings the following effects.

The reduction process is executed after at least one piece of video data is omitted by the selection process. Since the reduction process is not executed on unnecessary video data, a processing load of the reduction process is reduced.

3-4. Fourth Example

Figure 16:
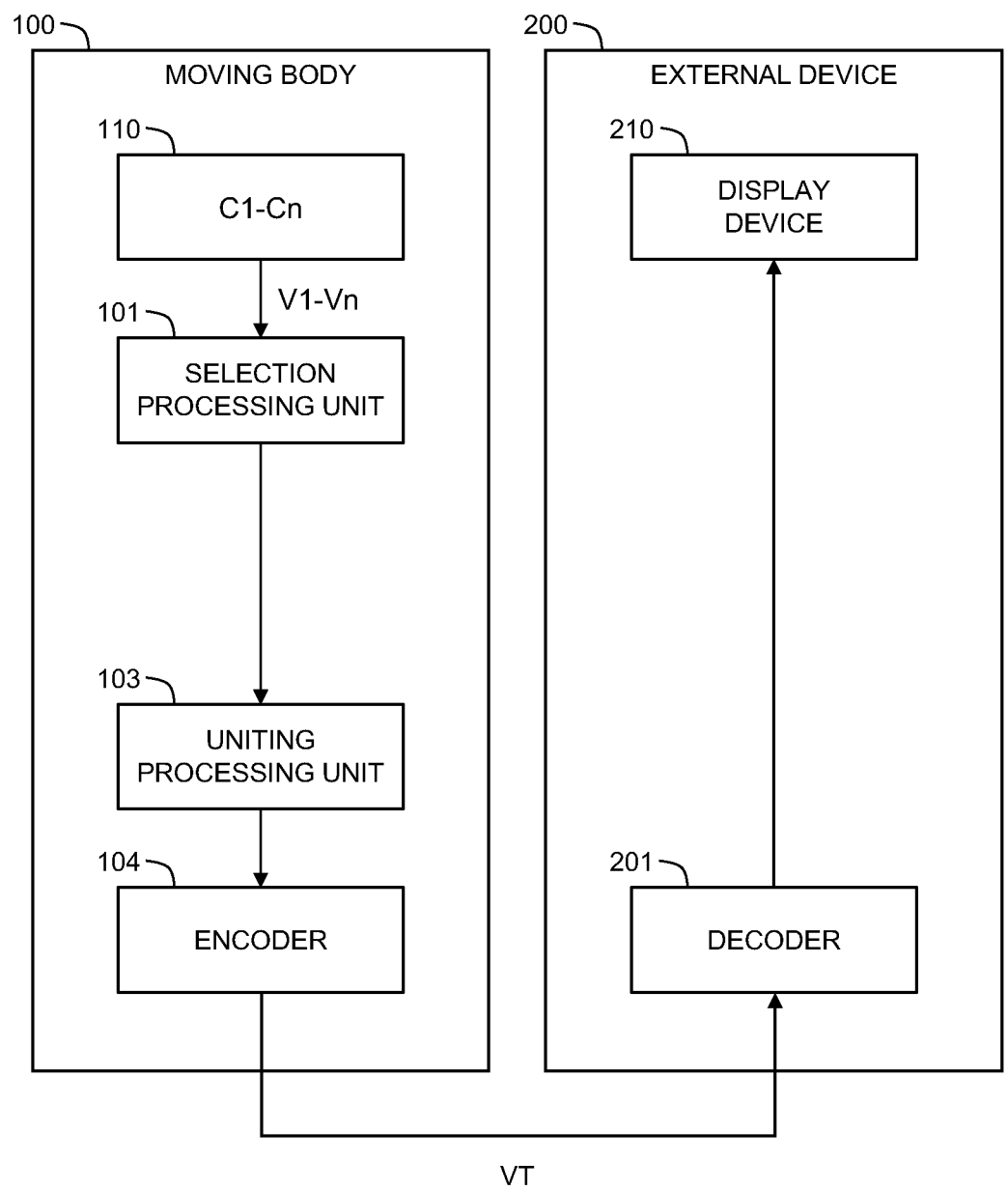
FIG. 16 is a block diagram for explaining a fourth example of a data reduction process according to an embodiment of the present disclosure.

FIG. 16 is a block diagram showing a fourth example of the data reduction process. A description overlapping with the first example and the second example will be omitted as appropriated. In the fourth example, the data reduction process includes the selection process and the uniting process. The selection process and the uniting process are executed in this order. Such the order of processing brings the following effects.

The uniting process is executed after at least one piece of video data is omitted by the selection process. Since the uniting process is not executed on unnecessary video data, the processing load of the uniting process is reduced.

3-5. Fifth Example

Figure 17:
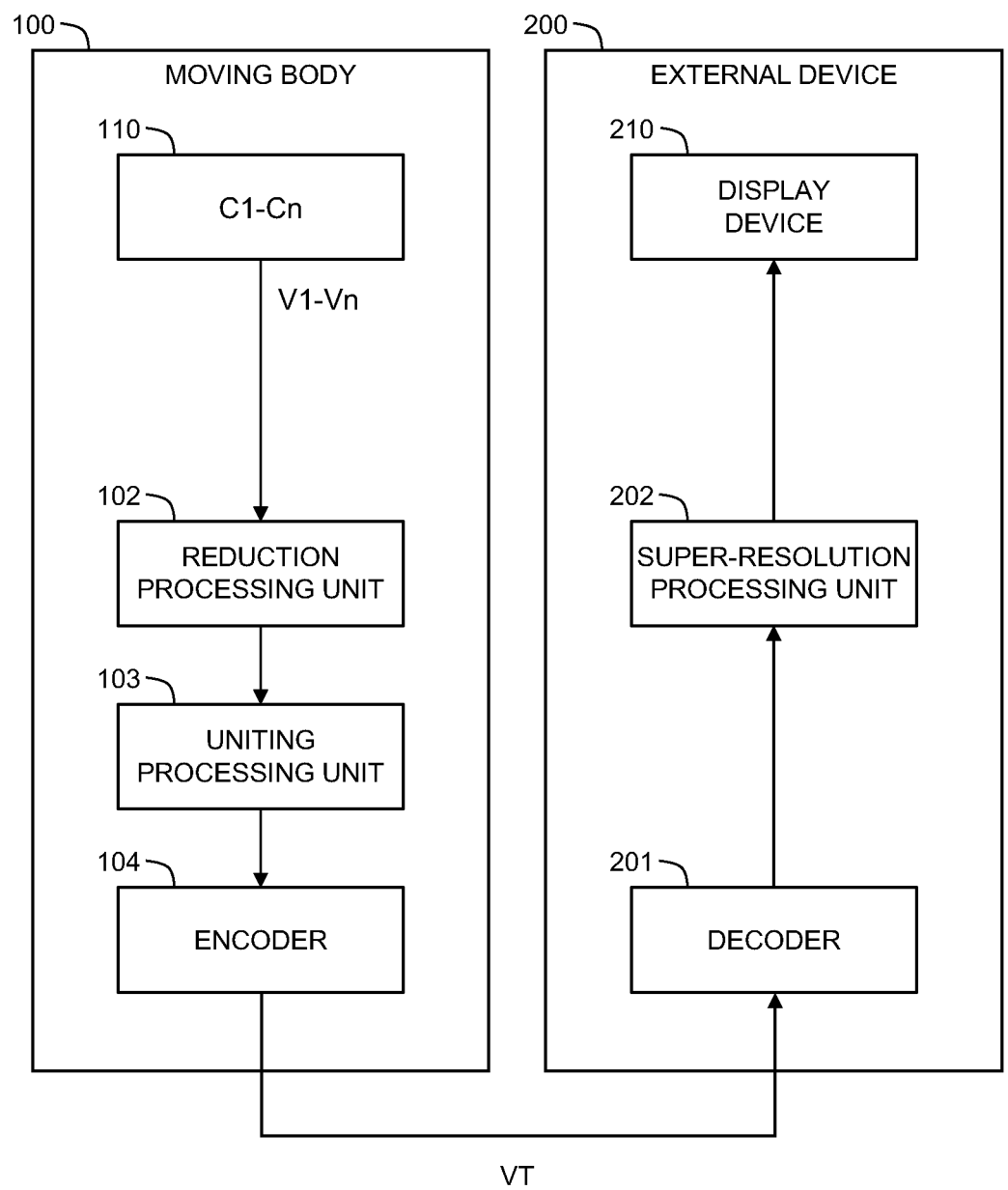
FIG. 17 is a block diagram for explaining a fifth example of a data reduction process according to an embodiment of the present disclosure.

FIG. 17 is a block diagram showing a fifth example of the data reduction process. A description overlapping with the first example and the second example will be omitted as appropriate. In the fifth example, the data reduction process includes the reduction process and the uniting process. The reduction process and the uniting process are executed in this order. Such the order of processing brings the following effects.

The uniting process is executed after the video data is reduced by the reduction process. That is, the uniting process is executed after the image size is reduced by the reduction process. Therefore, the processing load of the image processing required in the uniting process is reduced.

4. Configuration Example of Moving Body

Figure 18:
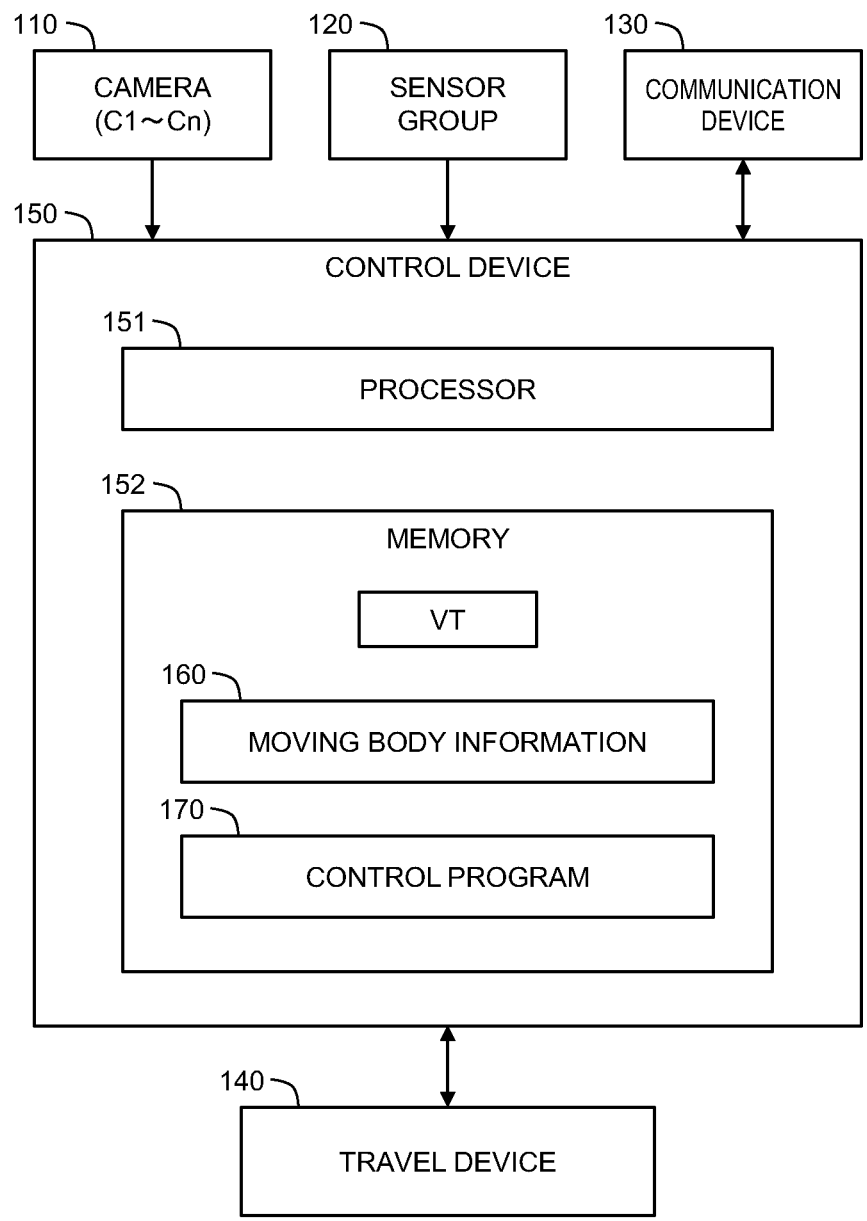
FIG. 18 is a block diagram showing a configuration example of a moving body according to an embodiment of the present disclosure.

FIG. 18 is a block diagram showing a configuration example of the moving body 100. The moving body 100 includes a camera 110 (a plurality of cameras C1 to Cn), a sensor group 120, a communication device 130, a travel device 140, and a control device 150. In the present example, the moving body 100 is one having wheels, such as a vehicle and a robot.

The camera 110 captures video data indicating a situation around the moving body 100.

The sensor group 120 includes a state sensor that detects a state of the moving body 100. The state sensor includes a speed sensor, an acceleration sensor, a yaw rate sensor, a steering angle sensor, and the like. The sensor group 120 also includes a position sensor that detects a position and an orientation of the moving body 100. The position sensor is exemplified by a GPS (Global Positioning System) sensor. Moreover, the sensor group 120 may include a recognition sensor other than the camera 110. The recognition sensor recognizes (detects) the situation around the moving body 100. Examples of the recognition sensor include a LIDAR (Laser Imaging Detection and Ranging), a radar, and the like.

The communication device 130 communicates with the outside of the moving body 100. For example, the communication device 130 communicates with the external device 200.

The travel device 140 includes a steering device, a driving device, and a braking device. The steering device turns wheels of the moving body 100. For example, the steering device includes an electric power steering (EPS) device. The driving device is a power source that generates a driving force. Examples of the drive device include an engine, an electric motor, an in-wheel motor, and the like. The braking device generates a braking force.

The control device (controller) 150 controls the moving body 100. The control device 150 includes one or more processors 151 (hereinafter simply referred to as a processor 151) and one or more memories 152 (hereinafter simply referred to as a memory 152). The processor 151 executes a variety of processing. For example, the processor 151 includes a CPU (Central Processing Unit). The memory 152 stores a variety of information. Examples of the memory 152 include a volatile memory, a non-volatile memory, an HDD (Hard Disk Drive), an SSD (Solid State Drive), and the like. The functions of the control device 150 are implemented by the processor 151 executing a control program 170 being a computer program. The control program 170 is stored in the memory 152. The control program 170 may be recorded on a non-transitory computer-readable recording medium.

The processor 151 acquires moving body information 160 by using the camera 110 and the sensor group 120. The moving body information 160 includes the video data captured by the camera 110. Moreover, the moving body information 160 includes state information indicating the state of the moving body 100 detected by the state sensor. Furthermore, the moving body information 160 includes position information indicating the position and the orientation of the moving body 100 detected by the position sensor. Furthermore, the moving body information 160 includes object information regarding an object recognized (detected) by the recognition sensor. The object information indicates a relative position and a relative velocity of the object with respect to the moving body 100.

Moreover, the processor 151 controls travel of the moving body 100. The travel control includes steering control, acceleration control, and deceleration control. The processor 151 executes the travel control by controlling the travel device 140. The processor 151 may perform automated driving control. When performing the automated driving control, the processor 151 generates a target trajectory of the moving body 100 based on the moving body information 160. The target trajectory includes a target position and a target velocity. Then, the processor 151 executes the travel control such that the moving body 100 follows the target trajectory.

Further, the processor 151 communicates with the external device 200 via the communication device 130. For example, the processor 151 transmits at least a part of the moving body information 160 to the external device 200 as necessary.

In particular, the processor 151 transmits the video data captured by the camera 110 to the external device 200. At this time, the processor 151 executes the data reduction process described above. Then, the processor 151 transmits the transmission video data VT acquired by the data reduction process to the external device 200.

When the remote support of the moving body 100 is performed, the processor 151 receives the operator instruction from the remote operator terminal 200A. Then, the processor 151 executes the travel control in accordance with the operator instruction.

5. Configuration Example of Remote Operator Terminal

Figure 19:
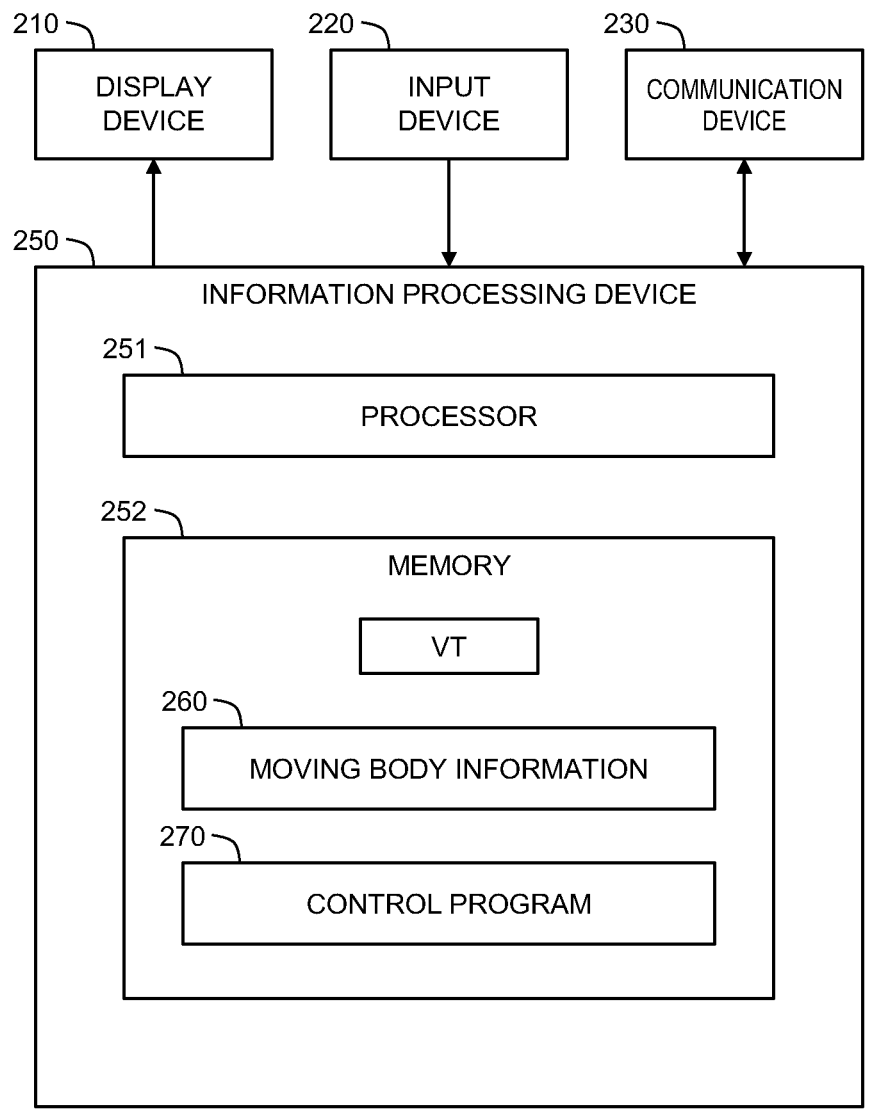
FIG. 19 is a block diagram showing a configuration example of a remote operator terminal according to an embodiment of the present disclosure.

FIG. 19 is a block diagram showing a configuration example of the remote operator terminal 200A which is an example of the external device 200. The remote operator terminal 200A includes a display device 210, an input device 220, a communication device 230, and an information processing device 250.

The display device 210 displays a variety of information. Examples of the display device 210 include a liquid crystal display, an organic EL display, a head-mounted display, a touch panel, and the like.

The input device 220 is an interface for accepting input from the remote operator. Examples of the input device 220 include a touch panel, a keyboard, a mouse, and the like. In a case where the remote support is the remote driving, the input device 220 includes a driving operation member used by the remote operator for performing a driving operation (steering, acceleration, and deceleration).

The communication device 230 communicates with the outside. For example, the communication device 230 communicates with the moving body 100.

The information processing device 250 executes a variety of information processing. The information processing device 250 includes one or more processors 251 (hereinafter simply referred to as a processor 251) and one or more memories 252 (hereinafter simply referred to as a memory 252). The processor 251 executes a variety of processing. For example, the processor 251 includes a CPU. The memory 252 stores a variety of information. Examples of the memory 252 include a volatile memory, a non-volatile memory, an HDD, an SSD, and the like. The functions of the information processing device 250 are implemented by the processor 251 executing a control program 270 being a computer program. The control program 270 is stored in the memory 252. The control program 270 may be recorded on a non-transitory computer-readable recording medium.

The processor 251 executes a remote support process that remotely supports an operation of the moving body 100. The remote support process includes an "information providing process" and an "operator instruction notification process."

The information providing process is as follows. The processor 251 receives the moving body information 260 necessary for the remote support from the moving body 100 via the communication device 230. The moving body information 260 includes at least a part of the moving body information 160. In particular, the moving body information 260 includes the transmission video data VT transmitted from the moving body 100. If necessary, the processor 251 executes the above-described super-resolution process to improve the image quality of the transmission video data VT. Then, the processor 251 presents the moving body information 260 to the remote operator by displaying the moving body information 260 on the display device 210.

The remote operator views the moving body information 260 displayed on the display device 210 to grasp the situation around the moving body 100 and the state of the moving body 100. The remote operator remotely supports the operation of the moving body 100. Examples of the remote support performed by the remote operator include recognition support, judgement support, remote driving, and the like. The remote operator uses the input device 220 to input the operator instruction.

The operator instruction notification process is as follows. The processor 251 receives the operator instruction input by the remote operator from the input device 220. Then, the processor 251 transmits the operator instruction to the moving body 100 via the communication device 230.

What is claimed is:

1. A video transmission method for transmitting video data from a moving body to an external device, the video transmission method comprising:
   acquiring a plurality of pieces of video data respectively captured by a plurality of cameras mounted on the moving body;
   executing, at the moving body, a data reduction process that reduces a data amount of the plurality of pieces of video data to acquire transmission video data, wherein the data reduction process includes:
   a selection process that selects a part of the plurality of pieces of video data by omitting another part of the plurality of pieces of video data according to a planned movement direction of the moving body; and
   at least one of:
      a reduction process that reduces at least one of the plurality of pieces of video data; or
      a uniting process that combines first video data and second video data such that a screen of the second video data is displayed in a screen of the first video data; and
   transmitting the transmission video data after the data reduction process from the moving body to the external device.

2. The video transmission method according to claim 1, wherein
   the data reduction process includes at least the selection process and the uniting process,
   the selection process is executed prior to the uniting process, and
   the uniting process is performed on the selected piece of video data by the selection process.

3. The video transmission method according to claim 2, wherein
   the data reduction process further includes the reduction process,
   the selection process is executed prior to the reduction process, and
   the reduction process is performed on the selected piece of video data by the selection process.

4. The video transmission method according to claim 3, wherein
   the reduction process is executed prior to the uniting process.

5. The video transmission method according to claim 1, wherein
   the data reduction process includes at least the selection process and the reduction process,
   the selection process is executed prior to the reduction process, and
   the reduction process is performed on the selected piece of video data by the selection process.

6. The video transmission method according to claim 3, further comprising:
   applying, in the external device, a super-resolution technique to the video data to which the reduction process is applied.

7. The video transmission method according to claim 1, wherein
   the moving body is a target of a remote support performed by a remote operator, and
   the external device is a remote operator terminal on a side of the remote operator.

8. A video transmission system for transmitting video data from a moving body to an external device,
   the video transmission system comprising one or more processors configured to:
   acquire a plurality of pieces of video data respectively captured by a plurality of cameras mounted on the moving body;
   execute, at the moving body, a data reduction process that reduces a data amount of the plurality of pieces of video data to acquire transmission video data, wherein the data reduction process includes:
   a selection process that selects a part of the plurality of pieces of video data by omitting another part of the plurality of pieces of video data according to a planned movement direction of the moving body; and
   at least one of:
      a reduction process that reduces at least one of the plurality of pieces of video data; or
      a uniting process that combines first video data and second video data such that a screen of the second video data is displayed in a screen of the first video data; and
   transmitting the transmission video data after the data reduction process from the moving body to the external device.

9. A control device for controlling a moving body, the control device comprising one or more processors configured to:
   acquire a plurality of pieces of video data respectively captured by a plurality of cameras mounted on the moving body;
   execute, at the moving body, a data reduction process that reduces a data amount of the plurality of pieces of video data to acquire transmission video data, wherein the data reduction process includes:
  a selection process that selects a part of the plurality of pieces of video data by omitting another part of the plurality of pieces of video data according to a planned movement direction of the moving body; and
  at least one of:
    a reduction process that reduces at least one of the plurality of pieces of video data; or
    a uniting process that combines first video data and second video data such that a screen of the second video data is displayed in a screen of the first video data; and
  transmit the transmission video data after the data reduction process to an external device.

* * * * *